United States Patent

Holstein et al.

[11] Patent Number: 5,833,411
[45] Date of Patent: Nov. 10, 1998

[54] VERTICAL BROACHING MACHINE

[75] Inventors: Herbert Holstein; Rudolf Dotsch, both of Solingen; Andreas Berktold, Neuss, all of Germany

[73] Assignee: Oswald Forst Maschinenfabrik u. Apparatebauanstalt GmbH & Co. Kommanditgesellschaft, Solingen, Germany

[21] Appl. No.: 867,843

[22] Filed: Jun. 3, 1997

[30] Foreign Application Priority Data

Jun. 19, 1996 [DE] Germany .................. 196 24 404.8

[51] Int. Cl.⁶ .................................................. B23D 41/06
[52] U.S. Cl. .......................... 409/269; 409/275; 409/282; 409/285
[58] Field of Search ..................... 409/264, 265, 409/266, 267, 269, 275, 277, 282, 260, 285

[56] References Cited

U.S. PATENT DOCUMENTS

| | | | |
|---|---|---|---|
| 1,569,862 | 1/1926 | Lapointe | 409/282 |
| 1,925,837 | 9/1933 | Jones et al. | 409/260 |
| 2,529,705 | 11/1950 | Pataki et al. | 409/264 |
| 2,530,066 | 11/1950 | Laase | 409/282 |
| 3,103,852 | 9/1963 | Bonnafe | 409/285 |
| 4,266,894 | 5/1981 | Zuzanov et al. | 409/283 |
| 4,558,579 | 12/1985 | Petkov et al. | 72/56 |
| 5,755,539 | 5/1998 | Takeuchi et al. | 409/275 |

FOREIGN PATENT DOCUMENTS 1292994  6/1974  Germany .

*Primary Examiner*—A. L. Pitts
*Assistant Examiner*—Christopher Kirkman
*Attorney, Agent, or Firm*—Browdy and Neimark

[57] ABSTRACT

A vertical broaching machine comprises a machine stand having an upper rail and a lifting carriage displaceably guided on the stand and drivable by means of lifting spindles which are supported in spindle nuts lodged in the rail for rotational driving. An upper workpiece holder is mounted on the rail, holding a broach when a compressive broaching job is carried out.

7 Claims, 5 Drawing Sheets

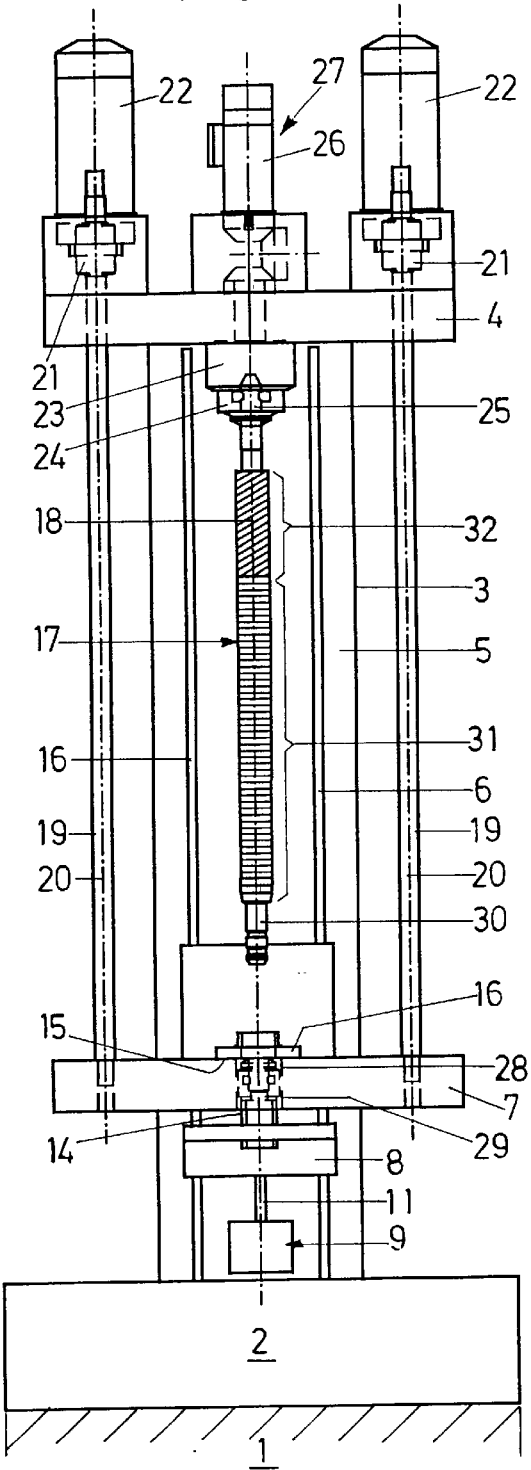
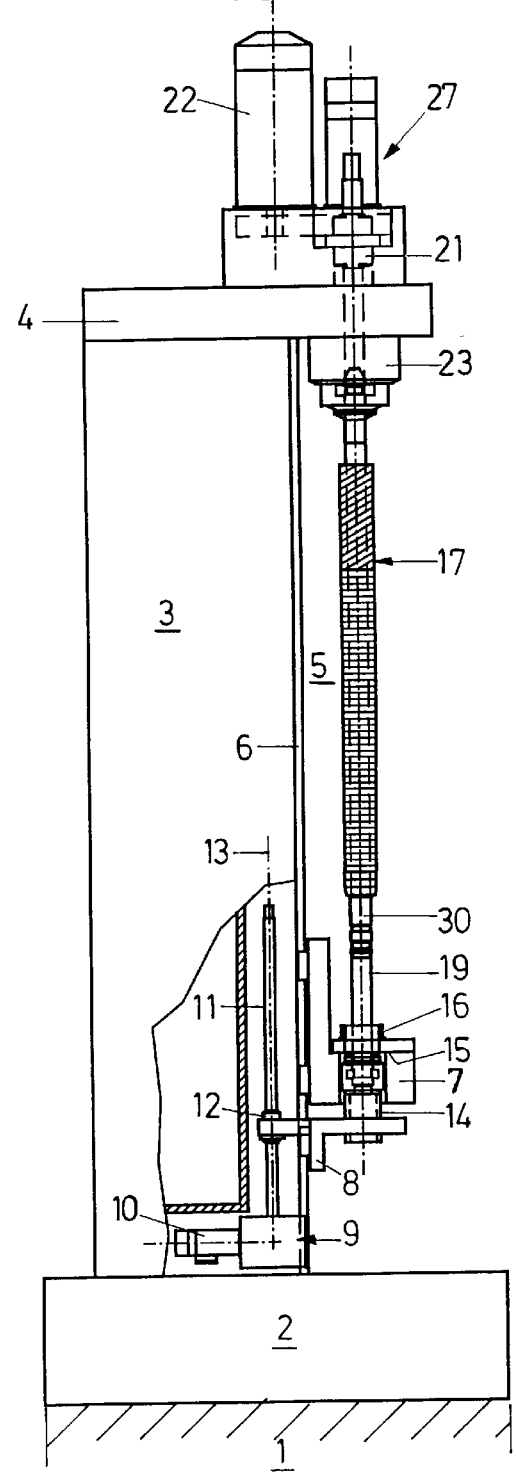

5,833,411

VERTICAL BROACHING MACHINE

BACKGROUND OF THE INVENTION

1. Field of the Invention

The invention relates to a vertical broaching machine comprising a machine stand, an upper rail mounted on the machine stand, a lifting carriage vertically displaceably guided on the machine stand, a feeder carriage disposed underneath the lifting carriage, two lifting spindles having their central longitudinal axes in a common plane and connecting the rail and the lifting carriage, spindle drives allocated to the lifting spindles and being in rotationally driving connection with the latter, at least one upper broach holder mounted on the rail, at least one workpiece feed disposed on the lifting carriage and serving to receive a workpiece to be broached, and at least one lower broach holder mounted on the feeder carriage.

2. Background Art

A vertical broaching machine in the form of a so-called lifting table machine is known from German patent 12 92 994. Actuation of the lifting table takes place by means of hydraulic drives. A pull-type broaching job is carried out. Twist broaching jobs are not intended to take place on this machine.

Further, it is known to design vertical broaching machines for twist broaching, pull-type broaching operations being carried out in which the broaching forces are absorbed by the machine stand.

SUMMARY OF THE INVENTION

It is the object of the invention to embody a vertical broaching machine which ensures high broaching accuracy.

According to the invention, this object is attained by one workpiece feed and one upper broach holder and one lower broach holder at a time being disposed coaxially to the central longitudinal axis of a broach and symmetric to the central longitudinal axes of the lifting spindles. The broaching machine according to the invention allows compressive broaching, the lifting spindles taking up the tensile stress and the broach being exposed to compressive stress. The entire broaching forces remain within the system consisting of the lifting table, rail, lifting spindles and broach. The machine stand itself is free from forces.

An improvement resides in that the lifting spindles are non-rotatable relative to the rail and the lifting carriage and supported in spindle nuts which are drivable to rotate. This improvement causes the high forces that occasion on the lifting spindles and are directed axially to be translated and absorbed especially easily. In addition, in this case the sizing section of the broach is adjacent to the upper broach holder, i.e. during the sizing and broaching stroke, the entire system possesses the highest rigidity. In this connection, the embodiment, according to which the spindle nuts are supported on the rail in the direction toward the lifting carriage and are drivable to rotate by means of spindle drives allocated to the rail, is particularly advantageous, since the driving motors for actuation of the spindles can be accommodated at a place not moved. By advantage, the lifting spindles are roller-type screw drives.

The broaching machine according to the invention is particularly suitable to be used as a twist broaching machine, advantageous developments of this consisting in that for the production of a twist-broaching operation, the upper broach holder is drivable to rotate by means of a twist motor, that the twist motor comprises a geared motor allocated to the rail, and that the twist motor comprises a twist bar, which is parallel to the broach, held on the lifting carriage and received in a twist nut, the twist bar or the twist nut being in rotational connection with the upper workpiece holder.

Further features, advantages and details of the invention will become apparent from the ensuing description of two exemplary embodiments, taken in conjunction with the drawing.

BRIEF DESCRIPTION OF THE DRAWING

FIG. 1 is a front view of a vertical broaching machine at the end of a return stroke, FIG. 2 is a lateral view of the broaching machine of FIG. 1 in an illustration partially broken open.

DESCRIPTION OF THE PREFERRED EMBODIMENTS

Figure 3:
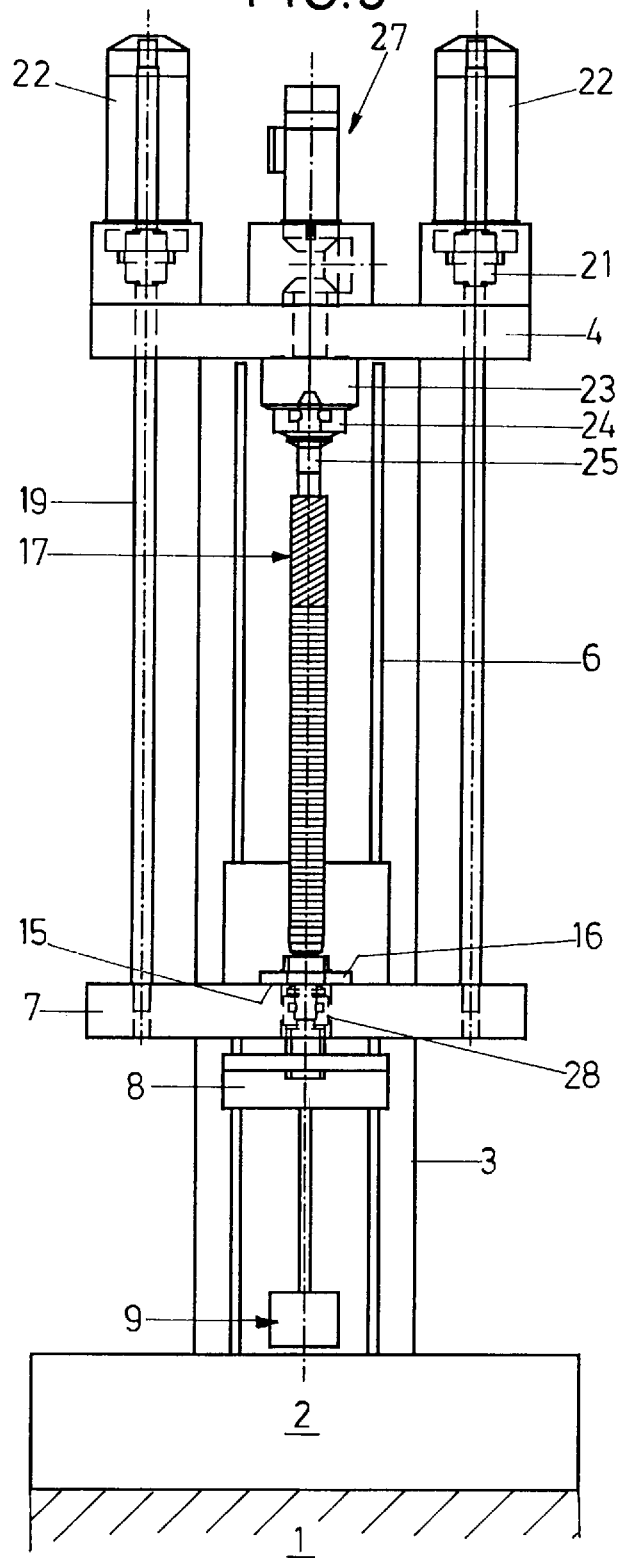
FIG. 3 is a front view of the broaching machine at the beginning of the broaching stroke.
Figure 4:
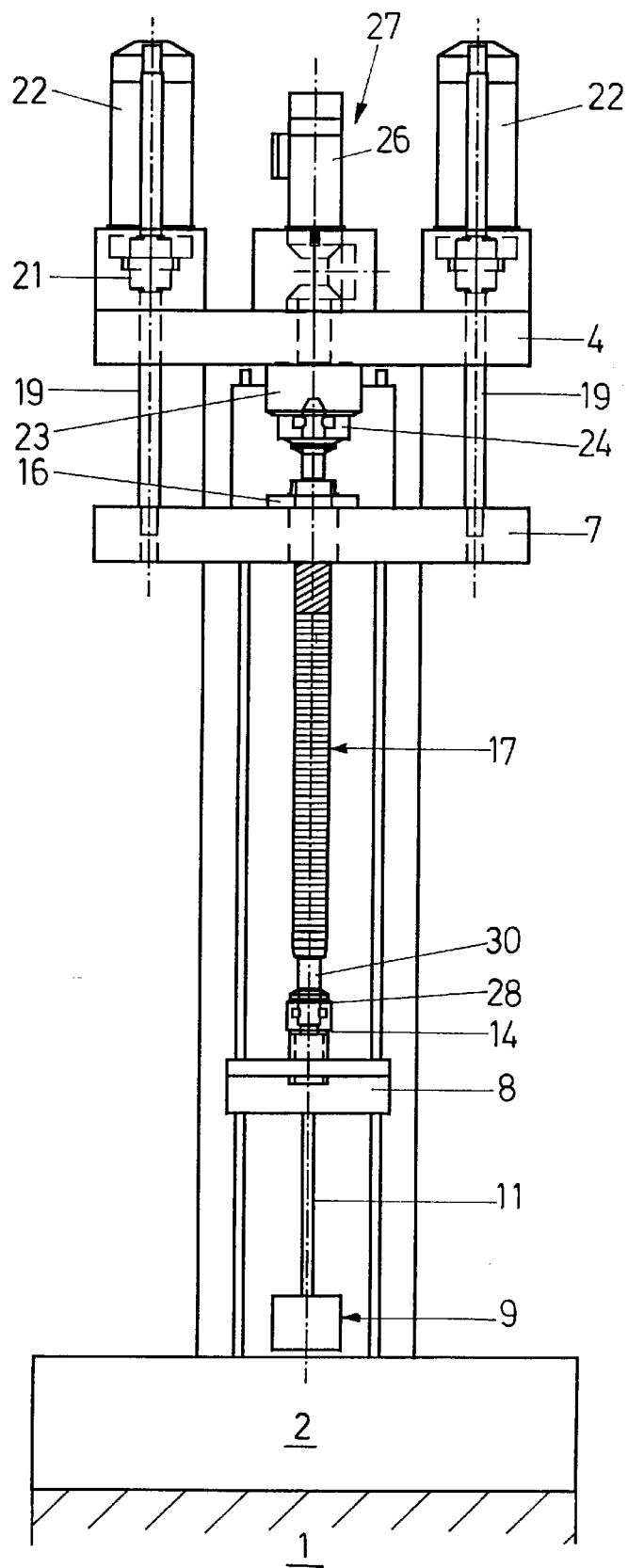
FIG. 4 is a front view of the broaching machine at the end of the broaching stroke.
Figure 5:
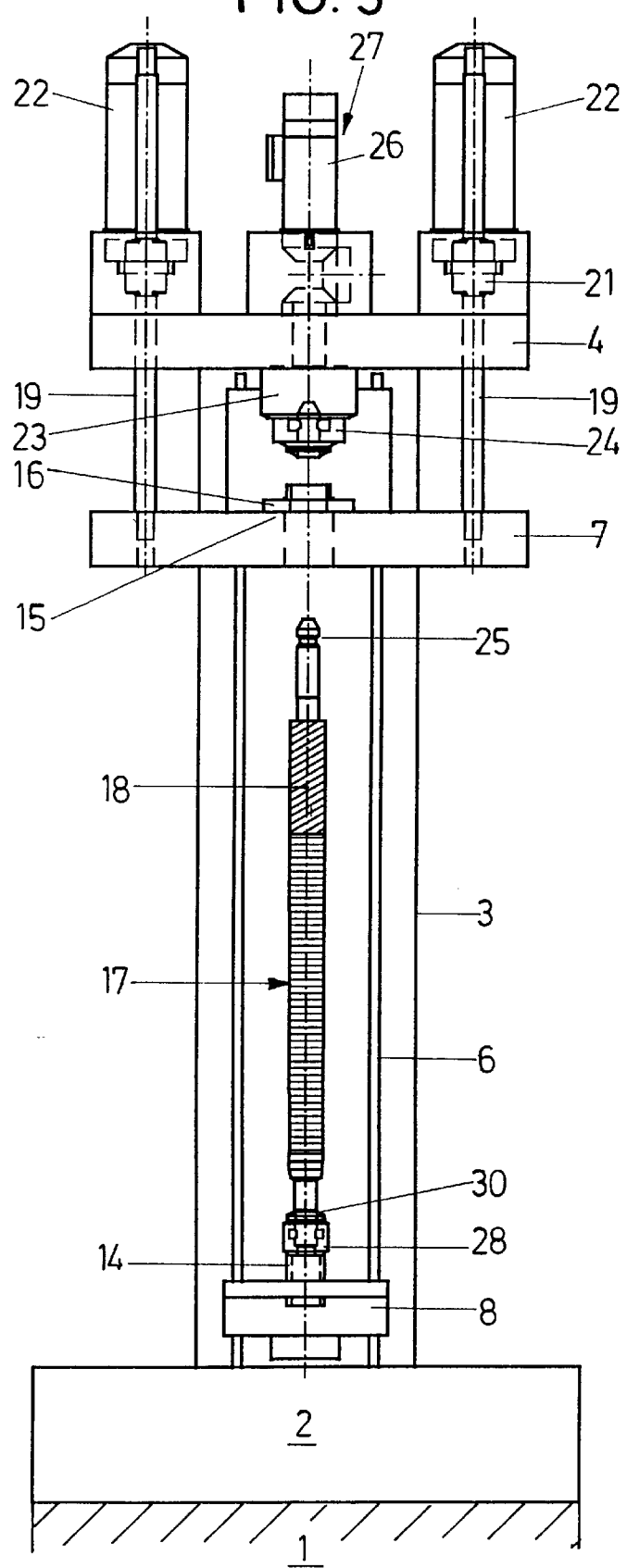
FIG. 5 is a front view of the broaching machine during tool change.

As seen in FIGS. 1 and 2, a vertical internal broaching machine according to the invention comprises a base 2 which is supported on a foundation 1 and on which a stand 3 is mounted. On the stand 3, provision is made for a rail 4 which projects from the face 5 of the stand 3, as seen in FIG. 2. Vertically extending carriage guides 6 are mounted on the face 5 of the machine stand 3, a lifting carriage 7 being vertically displaceably guided on them and serving as a machine table.

Under the lifting carriage 7, a feeder carriage 8 is disposed on the carriage guides 6 for vertical displacement by means of a feeder-carriage drive 9. The drive 9 comprises a feeder-driving motor 10 which drives a feeder spindle 11 disposed vertically. A spindle nut 12 which is tightly connected with the feeder carriage 8 is disposed on this spindle 11 so that, upon rotation of the spindle 11 about its axis 13, the feeder carriage 8 is displaced in the vertical direction. A lower broach holder 14 is mounted on the feeder carriage 8.

The lifting carriage 7 comprises a workpiece feed 15 for receiving a workpiece 16 to be broached by means of an internal broach 17. On each side of the broach 17, provision is made for a roller-type screw drive, these drives serving as lifting spindles 19 on the lifting carriage 7 in a plane that is common to them and to the central longitudinal axis 18 of the broach 17; they are disposed in such a way that their vertical central longitudinal axes 20 have identical distances from the axis 18. This ensures that no tilting moments resulting from different lever arm conditions are exercised on the lifting carriage 7. When several feeds 15 are disposed on the lifting carriage 7, corresponding conditions of symmetry apply to these too.

The lifting spindles 19 are received in spindle nuts 21 which are rotatably lodged in the rail 4 and supported axially downward. Each spindle nut 21 is electric motor driven by spindle drives 22, which are likewise disposed on the rail 4.

Coaxially with the axis 18 of the broaching tool 17, an upper broach holder 23 is mounted on the rail, comprising a retriever 24 for a tail end 25 of the broach 17. In the present embodiment, the upper broach holder 23 is rotatable so as to be able to perform a twist-broaching operation by means of the broach 17 in the form of a twist broach. To this end, the upper broach holder 23 of the present embodiment can be driven by means of a twist motor 27 substantially formed by a geared motor 26.

All the driving motors 10, 22, 26 are controlled by a CNC control (not shown).

The lower broach holder 14 comprises a puller 28 which can be retracted into a recess 29 formed in the lifting carriage 7 under the feed 15 and serves to receive and hold the lower pull end 30 of the broach 17.

The functioning of the broaching machine described is explained in the following, based on FIGS. 1 to 5.

In the illustration according to FIGS. 1 and 2, the lifting carriage 7 is in its lower position. The feeder carriage 7 is in a central position in which the puller 28 is situated in the recess 29 under the feed 15. The tail end 25 of the broach 17 is held in the upper broach holder 23. A workpiece 16 to be broached is inserted in the feed 15. This lower position of the lifting carriage 7 corresponds to the loading position.

According to FIG. 3, prior to the start of the broaching stroke, the lifting carriage 7 and the feeder carriage 8 are simultaneously displaced upward until the pull end 30 of the broach 17 is received and held in the puller 28 of the lower broach holder 14. The feeder carriage 8 remains in this upper position, while the actual broaching stroke is started by the lifting spindles 19 being driven, the broaching section 31 adjacent to the pull end 30 being pushed through the workpiece 16 first, followed by the sizing section 32, adjacent to the tail end 25, of the broach 17; simultaneously, the broach 17 is rotated about its axis 18, corresponding to the twist to be produced. Consequently, compressive broaching takes place, in which the lifting spindles 19 are subject to tensile stress and the broach 17 is subject to compressive stress. At the end of the lifting stroke, when the sizing section 32 is completely pushed through the workpiece 16, the lifting carriage 7 has its smallest possible distance from the rail 4. The retriever 24 is opened and the feeder-driving motor 10 is triggered in such a way that the feeder carriage 8, inclusive of the broach 17 held by the lower broach holder 14, is displaced downward, i.e. into the lower position of the feeder carriage 8 seen in FIG. 5. In this position, the tail end 25 of the broach 17 is retracted downward from the workpiece 16 which is now taken out of the feed 15. A discharge device that is common practice in this regard is not illustrated. Then the feeder carriage 8 is again moved into its upper position so that the upper broach holder 23 can again take charge of the broach 17. Then, with the workpiece 16 located beside the feed 15, the lifting carriage 7 is moved into its lower position, the feeder carriage 8 likewise being moved into its central position seen in FIG. 1. Now the broached workpiece 16 is removed from the lifting carriage 7. The pull end 30 of the broach 17 is now sufficiently far above the feed 15 for another to-be-broached workpiece 16 to be placed into the latter. The broaching operation is then repeated.

Figure 6:
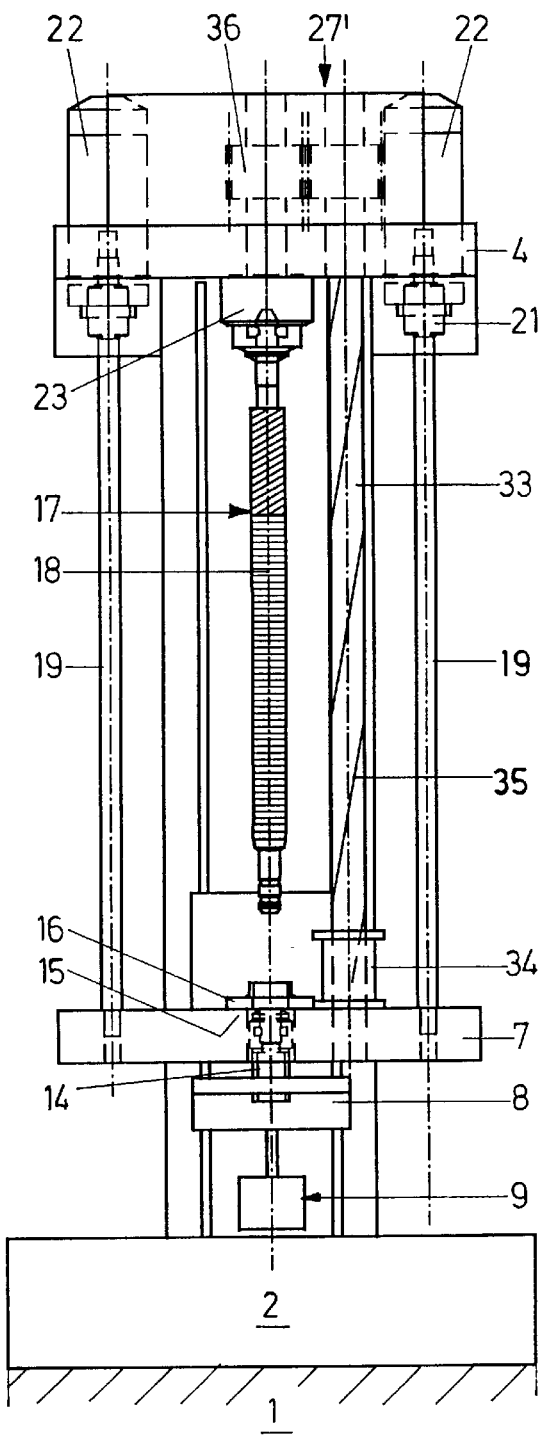
FIG. 6 is a front view of a broaching machine with a twist drive modified as compared with FIG. 1.
Figure 7:
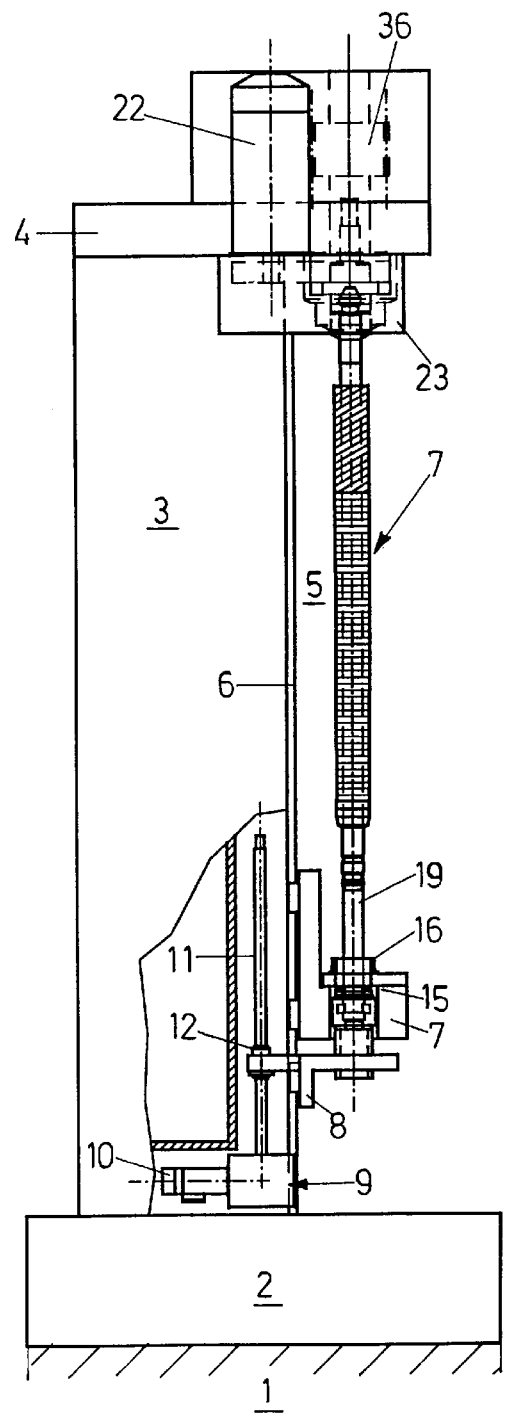
FIG. 7 is a lateral view of the broaching machine according to FIG. 6 in an illustration partially broken open.

The embodiment according to FIGS. 6 and 7 differs from that according to FIGS. 1 to 5 only in that the twist motor 27' has a so-called twist bar 33. Parallel to the axis 18 and in the plane spanned by the lifting spindles 19, the twist bar 33 is disposed rotatably in the rail 4 and the lifting carriage 7, it being received in the lifting carriage 7 by a twist nut 34 which is firmly mounted on the lifting carriage 7. Upon displacement of the lifting carriage 7, the twist bar 33 is rotated. It has a thread 35 which is designed corresponding to the desired twisting motion of the broach 17. Translation of the rotational motion of the twist bar 33 to the upper broach holder 23 takes place by means of a pinion gear 36. It is also possible to join the twist bar 33 non-rotatably to the lifting carriage 7 and to mount the twist nut 34 on the rail 4 for rotation in such a way that it confers its rotational motion directly to the pinion gear 36. The functioning of this broaching machine is identical to that explained in conjunction with FIGS. 1 to 5.

Fundamentally, it is also possible to use the broaching machine described as a pull-type broaching machine. In this case the broach 17 is inserted in the opposite direction, i.e. its pull end 30 is held in the upper broach holder 23. The broaching stroke takes place during the downward movement of the lifting carriage 7. In this case the workpiece feed 15 is mounted on the lower side of the lifting carriage 7. Inserting the workpiece 16 in the feed 15 takes place in the upper position of the lifting carriage 7, discharge in the lower position. The advantage of freedom from forces of the machine stand 3 is maintained in this case too.

What is claimed is:

1. A vertical broaching machine, comprising
   a machine stand (3),
   an upper rail (4) mounted on the machine stand (3),
   a lifting carriage (7) vertically displaceably guided on the machine stand (3),
   a feeder carriage (8) disposed underneath the lifting carriage (7),
   two lifting spindles (19) having central longitudinal axes (20) in a common plane and connecting the rail (4) and the lifting carriage (7),
   spindle drives (22) being in rotationally driving connection with the lifting spindles (19),
   at least one upper broach holder (23) mounted on the rail (4),
   at least one workpiece feed (15) disposed on the lifting carriage (7) and adapted to receive a workpiece (16) to be broached,
   at least one lower broach holder (14) mounted on the feeder carriage (8),
   wherein one upper broach holder (23) and one lower broach holder (14) define a central longitudinal axis (18) of a broach (17),
   wherein one workpiece feed (15) is disposed coaxially to said central longitudinal axis (18) of a broach (17), and
   wherein said central longitudinal axis (18) of a broach (17) is disposed in said common plane and symmetric to said central longitudinal axes (20) of said lifting spindles (19).

2. A vertical broaching machine according to claim 1, wherein the lifting spindles (19) are non-rotatable relative to the rail (4) and the lifting carriage (7) and supported in spindle nuts (21) which are drivable to rotate.

3. A vertical broaching machine according to claim 2, wherein the spindle nuts (21) are supported on the rail (4) in the direction toward the lifting carriage (7) and are drivable to rotate by means of spindle drives (22) mounted on the rail (4).

4. A vertical broaching machine according to claim 1, wherein the lifting spindles (19) are roller-type screw drives.

5. A vertical broaching machine according to claim 1, wherein the upper broach holder (23) is drivable to rotate by means of a twist motor (27, 27').

6. A vertical broaching machine according to claim 5, wherein the twist motor (27) comprises a geared motor (26) mounted on the rail (4).

7. A vertical broaching machine according to claim 5, wherein the twist motor (27') comprises a twist bar (33), which is parallel to said central longitudinal axis (18) of the broach (17), held on the lifting carriage (7) and received in a twist nut (34), one of the twist bar (33) and the twist nut (34) being in rotational connection with the upper workpiece holder (23).

* * * * *